United States Patent
Rizvi et al.

(10) Patent No.: US 12,510,976 B2
(45) Date of Patent: Dec. 30, 2025

(54) COMPUTER PERIPHERAL

(71) Applicant: Razer (Asia-Pacific) Pte. Ltd., Singapore (SG)

(72) Inventors: Farrukh Raza Rizvi, Singapore (SG); Wooi Liang Chin, Singapore (SG); Kok Kiong Low, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 18/849,565

(22) PCT Filed: May 31, 2022

(86) PCT No.: PCT/SG2022/050371
§ 371 (c)(1),
(2) Date: Sep. 23, 2024

(87) PCT Pub. No.: WO2023/234850
PCT Pub. Date: Dec. 7, 2023

(65) Prior Publication Data
US 2025/0224812 A1    Jul. 10, 2025

(51) Int. Cl.
*G06F 3/02*     (2006.01)
*H01H 13/705*   (2006.01)

(52) U.S. Cl.
CPC ......... *G06F 3/0202* (2013.01); *H01H 13/705* (2013.01); *H01H 2221/07* (2013.01)

(58) Field of Classification Search
None
See application file for complete search history.

(56) References Cited

U.S. PATENT DOCUMENTS

| | | |
|---|---|---|
| 3,749,859 A | 7/1973 | Webb et al. |
| 4,997,998 A | 3/1991 | Bauer |
| (Continued) | | |

FOREIGN PATENT DOCUMENTS

| | | |
|---|---|---|
| JP | 4627550 B2 | 2/2011 |
| TW | M524513 U | 6/2016 |
| (Continued) | | |

OTHER PUBLICATIONS

European Search Report; dated May 22, 2025; Application # 22945058.0.

*Primary Examiner* — Aneeta Yodichkas
(74) *Attorney, Agent, or Firm* — Polsinelli PC (57) ABSTRACT

In some aspects, a computer peripheral includes a display; an input interface assembly disposed over the display, a switch arrangement comprising at least one switch disposed between the input interface assembly and the display. The input interface assembly comprises a frame structure and at least one key movably coupled to the frame structure. The at least one key comprises a cap portion having a transparent section configured to permit viewing of information on the display through the transparent section. The at least one key comprises a pusher portion between the cap portion and a pivot mechanism. The pusher portion of the at least one key is aligned to the at least one switch so as to actuate the at least one switch to generate an input signal when the at least one key is depressed to pivot about the pivot mechanism from an undepressed state to a depressed state.

20 Claims, 7 Drawing Sheets

(56) References Cited

U.S. PATENT DOCUMENTS

| | | |
|---|---|---|
| 6,545,232 B1 | 4/2003 | Huo-Lu |
| 6,812,862 B1 | 11/2004 | Dempsey |
| 8,183,478 B2 | 5/2012 | Lamers et al. |
| 8,304,673 B2 | 11/2012 | Sun |
| 8,742,275 B1 | 6/2014 | Lam et al. |
| 9,087,659 B2 | 7/2015 | Li et al. |
| 9,336,972 B2 | 5/2016 | Hisada et al. |
| 9,443,673 B2 | 9/2016 | Chu et al. |
| 9,818,557 B2 | 11/2017 | Sun |
| 10,153,103 B1 | 12/2018 | Sun |
| 10,418,205 B2 | 9/2019 | Sun |
| 10,468,211 B2 | 11/2019 | Leong et al. |
| 10,546,702 B2 | 1/2020 | Sun |
| 10,680,611 B2 | 6/2020 | Li |
| 10,804,050 B2 | 10/2020 | Sun |
| 2008/0131184 A1* | 6/2008 | Brown ............... H01H 13/83 400/490 |
| 2011/0248920 A1 | 10/2011 | Larsen |
| 2011/0248921 A1 | 10/2011 | Larsen |
| 2015/0364276 A1 | 12/2015 | Li et al. |
| 2016/0042885 A1 | 2/2016 | Le |
| 2016/0239145 A1 | 8/2016 | Chang et al. |
| 2019/0212831 A1 | 7/2019 | Goldberg et al. |
| 2019/0341204 A1* | 11/2019 | Sun ..................... H01H 13/83 |
| 2020/0293151 A1 | 9/2020 | Taka et al. |
| 2021/0064231 A1 | 3/2021 | Seppinen et al. |
| 2021/0286502 A1* | 9/2021 | Lemay ............... G06F 3/04845 |

FOREIGN PATENT DOCUMENTS

| | | |
|---|---|---|
| TW | M544660 U | 7/2017 |
| TW | 201732523 A | 9/2017 |
| WO | 2011/008438 A2 | 1/2011 |

* cited by examiner

COMPUTER PERIPHERAL

TECHNICAL FIELD

The present disclosure generally relates to a computer peripheral, in particular, a computer peripheral with input/output functionality.

BACKGROUND

Computer peripherals are continually being improved to enhance functionality and provide better user experiences. One area of improvement has been to provide peripheral devices that combine input functionality with the ability to display changes or variation of the input functionality to the user. In some cases, this is implemented by using a virtual keyboard on a touch interactive display. The virtual keyboard approach has many benefits, including the ability to dynamically change the display for each key. However, interactive touch displays are often less desirable as they do not provide tactile user feedback, which can provide a more responsive and agreeable typing experience.

Therefore, there is a need to provide a computer peripheral that is capable to combine input functionality with dynamic display while augmenting user experience.

SUMMARY

According to a first aspect of the present disclosure, a computer peripheral, including: a display; an input interface assembly disposed over the display, wherein the input interface assembly includes a frame structure and at least one key movably coupled to the frame structure, and wherein the at least one key includes a cap portion having a transparent section configured to permit viewing of information on the display through the transparent section of the cap portion; a switch arrangement including at least one switch disposed between the input interface assembly and the display, the at least one switch being associated with the at least one key of the input interface assembly, wherein the at least one key is pivotally depressible relative to the frame structure between an undepressed state and a depressed state about a pivot mechanism; wherein the at least one key includes a pusher portion between the cap portion and the pivot mechanism, the pusher portion of the at least one key being aligned to the at least one switch in a manner so as to actuate the at least one switch to generate an input signal when the at least one key is depressed to pivot about the pivot mechanism from the undepressed state to the depressed state.

According to a second aspect of the present disclosure, an input interface assembly, including: a frame structure and at least one key movably coupled to the frame structure, wherein the at least one key includes a cap portion having a transparent section and wherein the frame structure has at least one opening in alignment with the transparent section; a switch arrangement including at least one switch disposed below the frame structure and the at least one key, the at least one switch being associated with the at least one key, wherein the switch arrangement includes at least one opening in alignment with the at least one opening of the frame structure; wherein the at least one key is pivotally depressible relative to the frame structure between an undepressed state and a depressed state about a pivot mechanism; wherein the at least one key includes a pusher portion between the cap portion and the pivot mechanism, the pusher portion of the at least one key being aligned to the at least one switch in a manner so as to actuate the at least one switch to generate an input signal when the at least one key is depressed to pivot about the pivot mechanism from the undepressed state to the depressed state.

DETAILED DESCRIPTION

Implementations described below in the context of a device, apparatus, or system are analogously valid for the respective methods, and vice versa. Furthermore, it will be understood that the implementations described below may be combined, for example, a part of one implementation may be combined with a part of another implementation, and a part of one embodiment may be combined with a part of another embodiment.

It should be understood that the terms "on", "over", "below", "beneath", "top", "bottom", "down", "side", "back", "left", "right", "front", "back", "lateral", "side", "up", "down", "vertical", "horizontal" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Approximating language, as used herein throughout the specification and claims, may be applied to modify any quantitative representation that could permissibly vary without resulting in a change in the basic function to which it is related. Accordingly, a value modified by a term or terms, such as "about," "substantially", is not limited to the precise value specified. In some instances, the approximating language may correspond to the precision of an instrument for measuring the value.

Various embodiments of what is described here seek to provide a computer peripheral capable of serving as an input device with one or more input elements while being able to dynamically change the visual indication (e.g. symbol, alphabet, number, motif, insignia, caption, logo, pattern, label, tag, emblem, image, animation etc.) on the one or more input element as the use and/or function of the one or more input element are changed or varied. In various embodiments, the computer peripheral may include a display integrated with the one or more input elements such that the display may be controlled to vary or change the visual indication exhibited or shown by the one or more input elements. For example, each of the one or more input elements may include an input interface assembly disposed over the display. The input interface assembly may include a frame structure and at least one key (or button) movably coupled to the frame structure. The input interface assembly may be configured to enable viewing the display through the input interface assembly, particularly through the at least one key (or button). The at least one key (or button) may include a cap portion having a transparent section configured to permit viewing of information (e.g. symbol, alphabet, number, motif, insignia, caption, logo, pattern, label, tag, emblem, image, animation etc.) on the display through the transparent section of the cap portion. The proposed computer peripheral may also include a switch arrangement including at least one switch (e.g. a tactile switch) disposed between the input interface assembly and the display. The at least one switch (e.g. a tactile switch) may be associated with the at least one key (or button) of the input interface assembly. The at least one key (or button) may be depressible relative to the frame structure between an undepressed state and a depressed state for activating the at least one switch.

For example, the at least one key (or button) may be pivotally depressible relative to the frame structure between an undepressed state and a depressed state about a pivot mechanism. The at least one key (or button) may include a pusher portion (e. g. an actuator) between the cap portion and the pivot mechanism, the pusher portion (e. g. the actuator) of the at least one key (or button) being aligned to the at least one switch (e. g. a tactile switch) in a manner so as to actuate the at least one switch (e. g. a tactile switch) to generate an input signal when the at least one key (or button) is depressed to pivot about the pivot mechanism from the undepressed state to the depressed state.

As will be described in various non-limiting embodiments, the proposed computer peripheral may be able to provide the visual indication associated with input functionality. The input functionality of the at least one key (or button) may be customized and programed to perform a desired task and the visual indication may be accordingly set as a thumbnail of that particular task that key (or button) is programmed for. The visual indication may be changed or varied when the input functionality is changed or varied depending on the application (e. g. software, games, website, etc.) that the computer peripheral is being used with. The display functionality may be enhanced through use of the input interface assembly having the keys (or buttons) that are at least partially transparent and coupled to the frame structure. The transparency may enable through-key viewing of the information produced by the display situated underneath the input interface assembly. Furthermore, tactile structures, such as tactile domes, may be provided to produce tactile user feedback during key activation. The tactile structures and hinge structures may be offset from the key centers, or otherwise situated so as to maximize useable display area of the underlying display.

According to some embodiments, the proposed computer peripheral may have a set of (e. g. one or more (or multiple)) keys (or buttons). Each key (or button) may provide a user the interface to provide an input (e. g. a command, a control, an alphabet, etc). The functionality of the respective key (or button) may be presented or shown (e. g. displayed) in a corresponding area of the display, thus forming the visual indication associated with the key, so as to be viewable through the cap portion of the respective key (or button), whereby the user may easily recognize the functionality of the respective key (or button), via the visual indication, as shown virtually on the key (or button). The functionality of the set of keys may be assigned and reassigned in accordance with an application running in the computer peripheral or a computer device that the computer peripheral is connected to. The display may produce information as an output based on a setting from the user, or information from the application, or for aesthetic appearance. The output may include information in connection with the respective key (or button) (e. g. visible from the respective key (or button)) or information displayed across a plurality of keys (or buttons) (e. g. visible from the plurality of keys (or buttons)) or the entire display (e. g. visible through the transparent sections of all cap portions of the set of keys).

In some embodiments of what is described here, the frame structure may include at least one opening and the at least one key (or button) may be coupled to the frame structure with the cap portion being exposed through the at least one opening. In some embodiments, the cap portion may protrude from (e.g. forming a step profile with the frame structure) the at least one opening. According to some embodiments, the at least one key (or button) may include at least one stopper (e.g one protrusion) to stop the at least one key (or button) from moving when the at least one key (or button) reaches the depressed state. For example, the at least one stopper (e.g one protrusion) and the pusher portion may be disposed in an opposing manner with respect to the cap portion of the key (or button). That is, when the key (or button) is depressed from an undepressed state to a depressed state, the at least one stopper (e.g one protrusion) may travels longer than the pusher portion.

According to some embodiments, the switch arrangement may include at least one opening in alignment with the at least one opening of the frame structure so as not to obstruct the viewing of the display through the transparent sections of the cap portions of the keys (or buttons). According to some embodiments, the at least one key (or button) may include at least one arm portion extending from the cap portion. The pivot mechanism may include two oppositely extending protrusions protruding from a free-end segment of the at least one arm portion. A first of the two oppositely extending protrusions may be inserted into a recess of the frame structure and a second of the two oppositely extending protrusions may be in abutment with a flat surface portion of a base housing structure or the switch plate. The second of the two oppositely extending protrusions may be a rounded tip in abutment with the flat surface portion of the base housing structure so as to be pivotable with respect to the flat surface portion or the switch plate.

In some instances, embodiments of the systems and techniques described here provide technical improvements and advantages over existing approaches. For example, the proposed computer peripheral may provide an input interface having mechanical clicking sensation equipped with a digital display at the same time. Although the travel path of the at least one key (or button) may be an angular displacement, it may be imperceptible due to the trivial angle that the at least one key (or button) moves. Further, as the pusher portion and the at least one stopper may be blocked by the at least one switch and the switch plate in a synchronous manner, the user may not sense the at least one key (or button) traveling in an arc-shaped path. The following examples pertain to various embodiments of the present disclosure.

Example 1 is a computer peripheral including: a display; an input interface assembly disposed over the display, wherein the input interface assembly includes a frame structure and at least one key movably coupled to the frame structure, and wherein the at least one key includes a cap portion having a transparent section configured to permit viewing of information on the display through the transparent section of the cap portion; a switch arrangement comprising at least one switch disposed between the input interface assembly and the display, the at least one switch being associated with the at least one key of the input interface assembly, wherein the at least one key is pivotally depressible relative to the frame structure between an undepressed state and a depressed state about a pivot mechanism; wherein the at least one key includes a pusher portion between the cap portion and the pivot mechanism, the pusher portion of the at least one key being aligned to the at least one switch in a manner so as to actuate the at least one switch to generate an input signal when the at least one key is depressed to pivot about the pivot mechanism from the undepressed state to the depressed state.

In Example 2, the subject matter of Example 1 may optionally include that the frame structure includes at least one opening and the at least one key is coupled to the frame structure with the cap portion being exposed through the at least one opening, wherein the at least one key includes at least one arm portion extending between the cap portion and the pivot mechanism underneath the frame structure.

In Example 3, the subject matter of Example 2 may optionally include that the at least one key includes two arm portions extending in a parallel manner from a same side of the cap portion, and two pivot mechanisms respectively disposed at free-end segments of the two arm portions.

In Example 4, the subject matter of Example 2 may optionally include that the cap portion of the at least one key and the at least one arm portion of the at least one key forms a step profile in a manner such that the cap portion protrudes from the at least one opening of the frame structure.

In Example 5, the subject matter of any of Examples 1 to 4 may optionally include that the at least one key is entirely made of transparent material.

In Example 6, the subject matter of any of Examples 1 to 5 may optionally include that the at least one switch include a mechanical-type switch capable of producing an audible click sound or providing a tactile sensation or both upon being actuated.

In Example 7, the subject matter of Example 6 may optionally include that the at least one switch includes dome switch having a deformable dome portion, wherein the dome portion is deformed by the pusher portion of the at least one key when the at least one key is depressed from the undepressed state to the depressed state.

In Example 8, the subject matter of any of Examples 1 to 7 may optionally include that the at least one key includes at least one stopper to stop the at least one key from moving when the at least one key reaches the depressed state.

In Example 9, the subject matter of Example 8 may optionally include that the at least one stopper is disposed along an edge of the at least one key opposite to the pusher portion with respect to the cap portion.

In Example 10, the subject matter of Example 9 may optionally include that the at least one key includes two stoppers respectively disposed at two corners of the edge of the at least one key.

In Example 11, the subject matter of Example 2 may optionally include a base housing structure, wherein the switch arrangement is disposed between the frame structure and the base housing structure.

In Example 12, the subject matter of Example 11 may optionally include that the at least one arm portion of the at least one key extends beyond the switch arrangement and the pivot mechanism is disposed directly between the frame structure and the base housing structure.

In Example 13, the subject matter of Example 12 may optionally include that the frame structure includes a recess on an underneath surface thereof and wherein the pivot mechanism is in engagement with the recess of the frame structure so as to prevent dislodgement of the at least one key when the at least one key is being pivoted about the pivot mechanism.

In Example 14, the subject matter of Example 13 may optionally include that the pivot mechanism includes two oppositely extending protrusions protruding from a free-end segment of the at least one arm portion, wherein a first of the two oppositely extending protrusions is inserted into the recess of the frame structure and a second of the two oppositely extending protrusions is in abutment with a flat surface portion of the base housing structure, wherein the second of the two oppositely extending protrusions has a rounded tip in abutment with the flat surface portion of the base housing structure so as to be pivotable with respect to the flat surface portion.

In Example 15, the subject matter of Example 12 may optionally include a circuit board disposed over the base structure and beneath the display.

In Example 16, the subject matter of Example 15 may optionally include that the switch arrangement includes an auxiliary circuit board and a switch plate having the at least one switch, wherein the auxiliary circuit board includes at least one switch contact circuit, the at least one switch contact circuit being associated to the at least one switch, wherein the auxiliary circuit board is between the display and the switch plate.

In Example 17, the subject matter of Example 16 may optionally include that the input signal is generated by the auxiliary circuit board when the at least one switch is being actuated.

In Example 18, the subject matter of Example 15 may optionally include that the circuit board includes a USB connector.

In Example 19, the subject matter of Example 16 may optionally include that each of the auxiliary circuit board and the switch plate includes at least one opening respectively in alignment with the at least one opening of the frame structure.

In Example 20, the subject matter of Example 15 may optionally include that the circuit board includes a processor, configured to execute the instructions: obtain data comprising operations performed by at least one software application; configure the display, based on the data, to designate operations that the at least one key performs in the at least one software application upon receiving an input from a user; display the operations on the display; enable, via the at least one key, the user to provide the input; convert the input into a required format that is understandable by the at least one software application; and transmit the converted input to the at least one software application to control the at least one software application.

In Example 21, the subject matter of any of Examples 1 to 20 may optionally include that the display is a liquid crystal display (LCD) device.

Example 22 is an input interface assembly including a frame structure and at least one key movably coupled to the frame structure, wherein the at least one key comprises a cap portion having a transparent section and wherein the frame structure has at least one opening in alignment with the transparent section; a switch arrangement comprising at least one switch disposed below the frame structure and the at least one key, the at least one switch being associated with the at least one key, wherein the switch arrangement comprises at least one opening in alignment with the at least one opening of the frame structure; wherein the at least one key is pivotally depressible relative to the frame structure between an undepressed state and a depressed state about a pivot mechanism; wherein the at least one key comprises a pusher portion between the cap portion and the pivot mechanism, the pusher portion of the at least one key being aligned to the at least one switch in a manner so as to actuate the at least one switch to generate an input signal when the at least one key is depressed to pivot about the pivot mechanism from the undepressed state to the depressed state.

Figure 1:
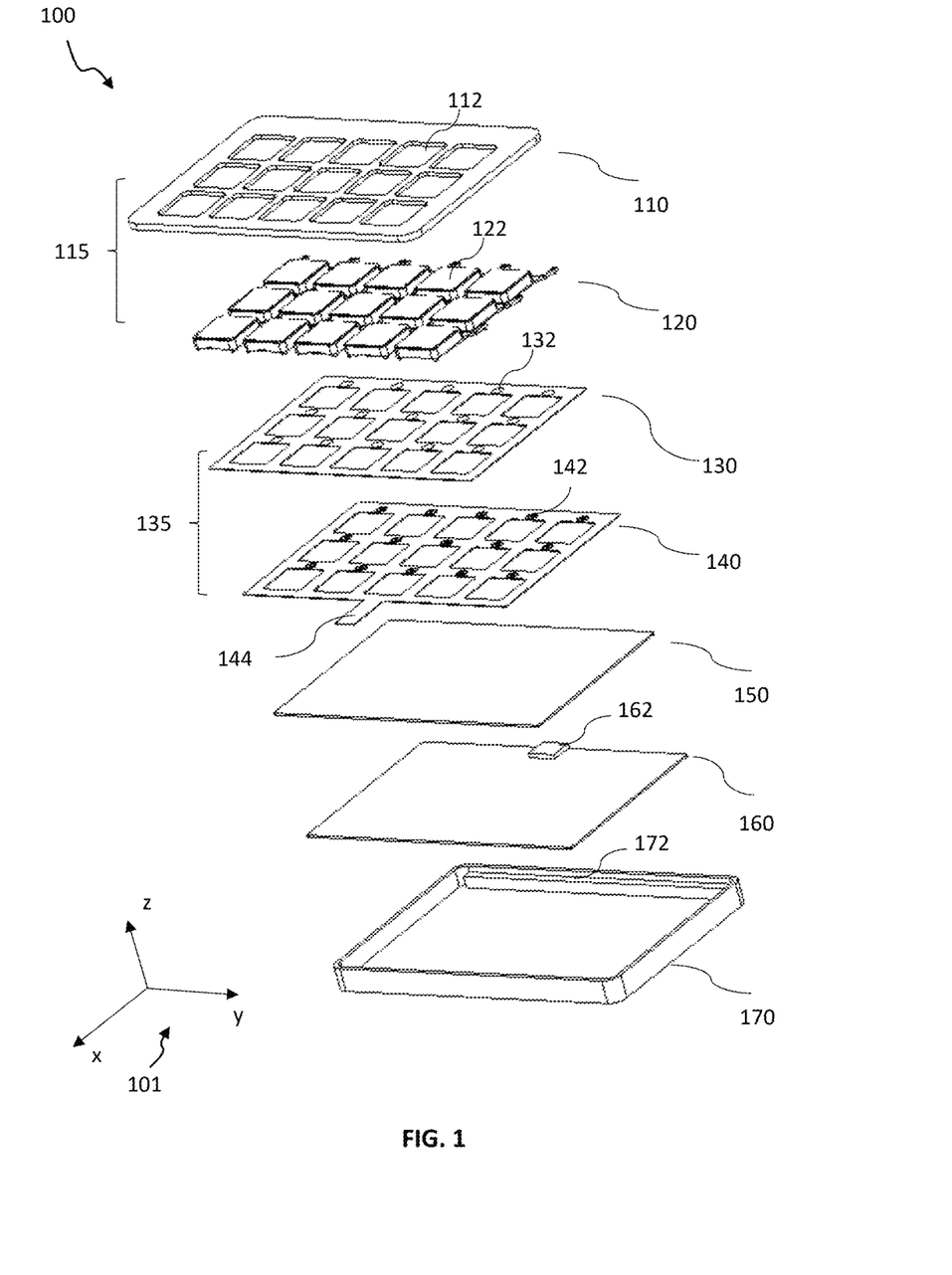
FIG. 1 is a diagram showing an exploded view of an example computer peripheral, according to an embodiment of the present disclosure.

FIG. 1 is an exploded view of a computer peripheral 100 according to an embodiment of the present disclosure. FIG. 1 also shows a frame of reference 101 having three orthogonal axes. The frame of reference 101 includes a first axis in a first direction (e. g., the X-direction), a second axis in a second direction (e. g., the Y-direction), and a third axis in a third direction (e. g., the Z-direction). The first, second, and third directions are perpendicular to each other. The computer peripheral 100 may include an input device sending data or instructions to a computer, such as a mouse, keyboard, graphics tablet, image scanner, barcode reader, game controller, light pen, light gun, microphone and webcam, an output device providing output data from the computer, such as a computer monitor, projector, and computer speaker, and an input/output device performing both input and output functions. The computer peripheral 100 may be connected to a computer to provide additional functionality to the computer and alternatively function independently without connecting to a computer.

According to various non-limiting embodiments, the computer peripheral 100 may include a display 150, an input interface assembly 115 disposed over the display 150, wherein the input interface assembly 115 may include a frame structure 110 and a set of keys 120 with at least one key (e. g.) 122 movably coupled to the frame structure 110. The display 150 may be a liquid crystal display (LCD) device or any other display types. The frame structure 110 may include at least one opening (e. g. 112) and the at least one key 122 may be coupled to the frame structure 110 in a manner so as to be exposed through the at least one opening 112. The set of keys 120 may be selectively physically depressed to produce any type of input signal for controlling a computing system residing in the computer peripheral 100 or a computer connected with the computer peripheral 100. The set of keys 120 may be assigned, for example, to provide functionality for various languages including, but not limited to, alphabets, characters, numbers and symbols, and/or to activate other input commands for controlling the computing system. In some implementations, the key functions of the set of keys 120 may change dynamically, for example in response to the changing operational context of an application running on the computing system.

According to various non-limiting embodiments, the set of keys 120 may be transparent or at least partially transparent so as to permit viewing of information on the display 150 through the set of keys 120. The term "Transparent" may include semi-transparent (e. g. translucent) and full-transparent (e. g. crystal clear) in a manner that the information displayed on the display 150 may be seen by the user through the set of keys 120. The information may include, but not limited to, images, text, video, and graphics information. The set of keys 120 may be formed using polycarbonates, acrylics or other transparent plastics to facilitate through-key viewing of the information. The set of keys 120 may be partially or entirely made of transparent material. In some implementations, the key function of a respective key of the set of keys 120 may be shown as graphical information or any other visual indication on a corresponding area of the display 150 that is viewable through the respective key. That is, the key function of the respective key may be virtually shown as visual indication on the respective key. For example, graphical information of a black right-pointing triangle may be viewable on the display 150 through the key 122, and pressing of the key 122 may generate an input signal of playing a selected song or video. In an alternate example, an alphabet "w" may be viewable on the display 150 through the key 122, and pressing of the key 122 may generate an input signal of typing "w" or any function that is assigned to the "w".

In some implementations, information may be displayed in a manner that is not necessarily associated in a spatial sense with an individual key. The information may be presented, for example, in a region that spans multiple keys. The computer peripheral 100 may provide a wide variety of displayable output to enhance and otherwise augment the user experience, including but not limited to alphabets, letters, numbers, symbols, images, videos, etc. The output information provided may be associated with or not be associated with the input functionality of the set of keys 120. The information may be provided, for example, for aesthetic purposes, to personalize the user experience, or to provide other types of output including display output for any purpose. Although the term "keys" will be used primarily, this term is non-limiting, and should be understood to include buttons and any other structure or mechanism that may be moved by a user to provide input. The configuration and arrangement of the set of keys 120 are provided herein as an exemplary embodiment and shall not be limited to the exemplary embodiment. For example, the number of keys may vary and the shape of keys may vary.

According to various non-limiting embodiments, the computer peripheral 100 may further include a switch arrangement 135, wherein the switch arrangement 135 may include an auxiliary circuit board 140 and a switch plate 130 having the at least one switch (e. g. 132) disposed between the input interface assembly 115 and the display 150. The at least one switch 132 may be associated with the at least one key 122 of the input interface assembly 115. That is, the switch 132 may be disposed on the switch plate 130 in such a manner that depressing the key 122 may activate the switch 132. The switch 132 may be a dome switch (e. g. a hybrid switch of flat-panel membrane and mechanical-switches), or a membrane switch (e. g. a full-travel membrane to actuate a contact in a circuit). Alternatively or additionally, the switch 132 may be a mechanical-type switch, for example including but not limited to, a linear switch, a tactile switch, or a click switch. The auxiliary circuit board 140 may include at least one switch contact circuit (e. g. 142). The at least one switch contact circuit 142 may be associated to the at least one switch 132. That is, the switch contact circuit 142 may be disposed on the auxiliary circuit board 140 in such a manner that depressing the key 122 may activate the switch 132 and consequently close the switch contact circuit 142 to provide an input signal. The auxiliary circuit board 140 may be between the display 150 and the switch plate 130. The auxiliary circuit board 140 may also include a connection flex 144 that allows flexible movement within the connection to the circuit board 160 through a mating connector. The connection flex 144 may be a flexible connection tail for the circuit board 160 which has contact fingers at the end thereof. As previously discussed, the set of keys 120 may be transparent or at least partially transparent to allow information produced by the display 150 to be viewed through the set of keys 120. The auxiliary circuit board 140 and the switch plate 130 may include at least one opening in alignment with the at least one opening of the frame structure 110 so as to allow information produced by the display 150 to be viewed through the auxiliary circuit board 140 and the switch plate 130.

According to various non-limiting embodiments, the computer peripheral 100 may include a base housing structure 170. The display 150 may be disposed on the base housing structure 170 and the switch arrangement 135 may be between the input interface assembly 115 and the display 150. For example, the base housing structure 170 and the frame structure 110 of the input interface assembly 115 may together form an exterior casing of the computer peripheral 100. Accordingly, the display 150, and the switch arrangement 135 may be disposed between the frame structure 110 and the base housing structure 170 such that they may be housed within an inner space defined by the frame structure 110 and the base housing structure 170. According to various embodiments, the computer peripheral 100 may further include a circuit board 160 disposed over the base structure 170 and beneath the display 150. The circuit board 160 may include a connector 162, such as a USB connector to transfer power and/or data. Computer peripherals to which embodiment apply may have different shapes, different sizes, different numbers and/or placements of keys, and/or other differences from the computer peripheral 100 shown in FIG. 1. Some features of the computer peripheral 100 that are shown in FIG. 1 are optional for function thereof and the computer peripheral 100 may include further features not shown in FIG. 1. For example, the auxiliary circuit board 140 and the circuit board 160 may be combined as one circuit board.

The circuit board 160 may include a processor, configured to execute the instructions: obtain data comprising operations performed by at least one software application; configure the display 150, based on the data, to designate operations that the at least one key 122 performs in the at least one software application upon receiving an input from a user; display the operations on the display 150; enable, via the at least one key 122, the user to provide the input; convert the input into a required format that is understandable by the at least one software application; and transmit the converted input to the at least one software application to control the at least one software application. The at least one key 122 may perform different functions in connection with different software applications and the functions thereof may be assigned dynamically in accordance with the running application. Accordingly, the functions of keys may be displayed in designated areas of the display 150 in association with the keys.

Figure 2A:
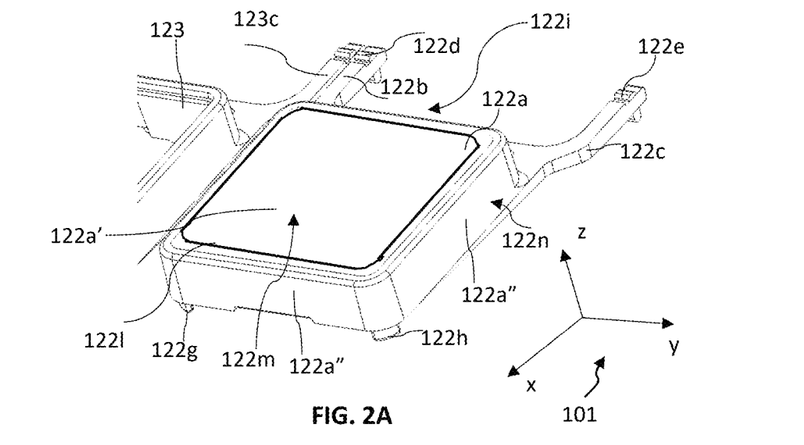
FIG. 2A is a diagram showing a front perspective view of an example key of the example computer peripheral of FIG. 1.
Figure 2B:
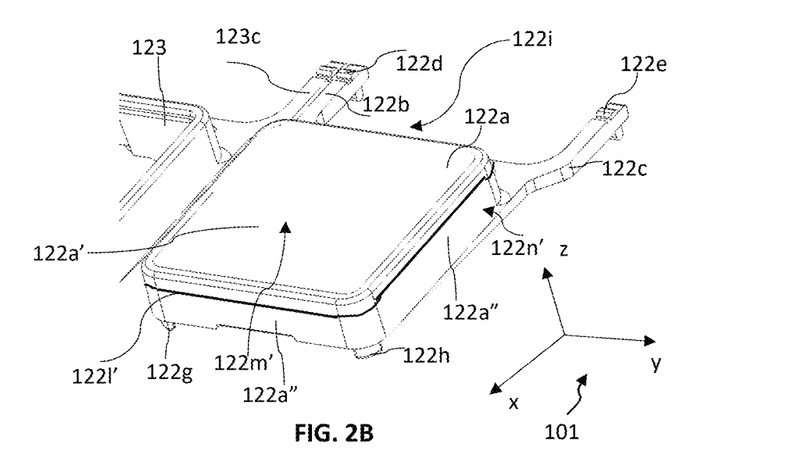
FIG. 2B is a diagram showing an alternative front perspective view of an example key of the example computer peripheral of FIG. 1.
Figure 2C:
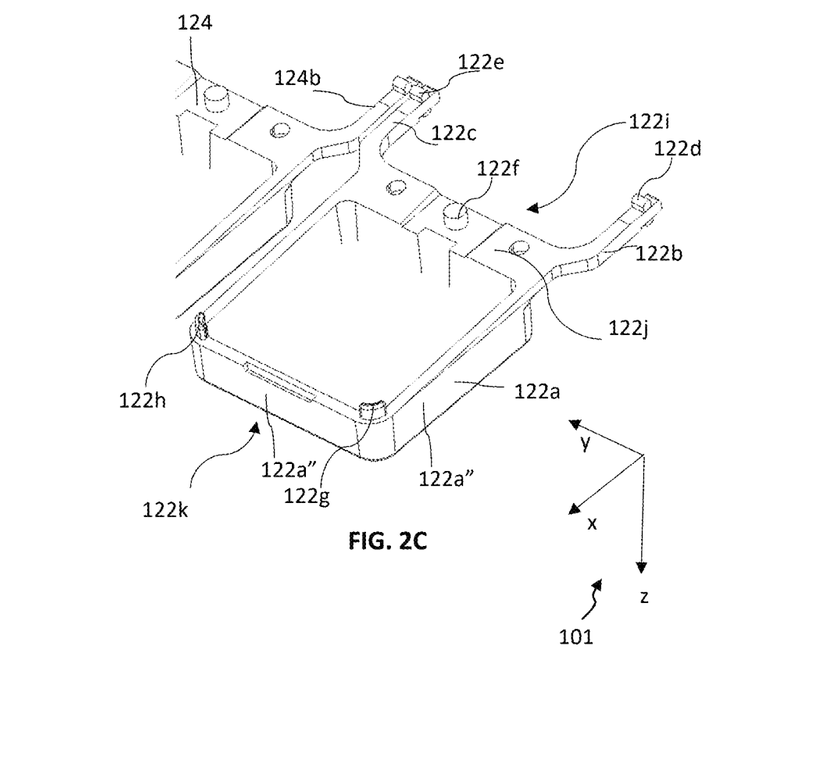
FIG. 2C is a diagram showing a back perspective view of an example key of the example computer peripheral of FIG. 1.

FIG. 2A depicts a front perspective view of the key 122 of the computer peripheral 100; FIG. 2B depicts an alternative front perspective view of the key 122 of the computer peripheral 100; FIG. 2C depicts a back perspective view of the key 122 of the computer peripheral 100. The description below will be mainly discussed with reference to the key 122, but it shall be appreciated that any other key (if any) of the set of keys 120 may be similar to the key 122. Referring to FIGS. 2A and 2B, in some embodiments, the key 122 may include a cap portion 122a, two arm portions 122b, 122c, extending in a parallel manner from a same side (e.g. 122i) of the cap portion 122a. By "extending in a parallel manner", it is intended to include extending substantially in a parallel manner, that is, the two arm portions 122b, 122c may be not necessarily parallel throughout the entire structures. The two arm portions 122b, 122c may be mirror images of each other.

Two pivot mechanisms 122d, 122e, respectively, may be disposed at free-end segments of the two arm portions 122b, 122c. By "free-end", it is intended to mean an end opposing to the other end of each arm portion that is joined to the cap portion 122a and the free end of each arm portion may be a loose end or a distal end that is situated away from the cap portion 122a. The two pivot mechanisms 122d, 122e may be parallel to each other such that the key 122 may be pivoted about the two pivot mechanisms 122d, 122e in a synchronous manner, and a first pivot axis about the pivot mechanism 122d may be parallel to a second pivot axis about the pivot mechanism 122e. The key 122 may be pivotally depressible relative to the frame structure 110 between an undepressed state and a depressed state about the pivot mechanisms 122d, 122e. The two pivot mechanisms 122d, 122e may be integral to the two arm portions 122b, 122c or securely attached to the two arm portions 122b, 122c. The two arm portions 122b, 122c and two pivot mechanisms 122d, 122e may be made from any suitable material(s), including plastic (e.g., injection molded), metal or combination of metals/alloys, etc.

The cap portion 122a may be configured to permit viewing of the information on the display 150 through the transparent sections 122m, 122m' of cap portion 122a. Dimensions of the at least one opening 112 of the frame structure may be configured to closely fit the at least one key 122 of the set of keys 120 such that a maximum area of the display 150 may be viewable through the set of keys 120.

It should be appreciated that although two arm portions 122b, 122c are shown herein, the key 122 may have one arm portion or three or any number of arm portions that enable movement of the key 122 and correspondingly the key 122 may have one pivot mechanism or three or any number of pivot mechanisms that enable movement of the key 122. For example, the key 122 may have one arm portion extending from the cap portion 122a and one pivot mechanism integral to or attached to or disposed a free-end segment of the one arm portion. The two arm portions 122b, 122c may extend from two corners of the same side 122i (edge) of the cap portion 122a of the key 122. In some implementations, the two arm portions 122b, 122c may extend outward from the two corners of the same side 122*i* (edge) of the cap portion 122*a* and extend away from each other (e.g. in directions perpendicular to each other) for a distance, and subsequently turn to extend in a parallel manner. Stated differently, the two arm portions 122*b*, 122*c* may include polyline structures each having two line segments forming an obtuse angle. Accordingly, the two pivot mechanisms 122*d*, 122*e* disposed on the free-end segments of two arm portions 122*b*, 122*c* may be spaced apart from each other by a width greater than a width of the side 122*i* of the cap portion 122*a* where the two arm portions 122*b*, 122*c* extend. The pivot mechanisms 122*d*, 122*e* disposed at the free-end segments of the two arm portions 122*b*, 122*c* may provide a stable support to the pivot movement of the key 122 due to the parallel dual dispositions.

Referring to FIGS. 2A and 2B, the key 122 may be partially transparent having a connection border 1221 as shown in FIG. 2A and an alternative connection border 1221' as shown in FIG. 2B. That is, the cap portion 122*a* within the connection borders 1221, 1221' (denoted as 122*m* in FIG. 2A and 122*m*' in FIG. 2B) may be transparent or made of transparent material, and the cap portion 122*a* outside or below the connection borders 1221, 1221' may be opaque or black (denoted as 122*n* in FIG. 2A and 122*n*' in FIG. 2B). The transparent sections 122*m*, 122*m*' of the cap portion 122*a* may be partially or fully surrounded by the opaque or black portions 122*n*, 122*n*' that may be made from black plastic. The transparent sections 122*m*, 122*m*' may be jointed with the opaque or black portions 122*n*, 122*n*' by any mechanical method like glue, insert moulding, double-shot injection moulding, welding, snap latched, or interference fit. The connection borders 1221, 1221' may be made out of metal with coating.

Referring to FIGS. 2A, 2B and 2C, in some embodiments, the cap portion 122*a* may have a square top section 122*a*' having a four edges section 122*a*" extending along a respective side of the square top section 122*a*' and each edge of the four edges section 122*a*" may be joined to two adjacent other edges and opposite to a fourth edge. Accordingly, the connection border 1221 may be disposed on the square top section 122*a*' and the connection border 1221' may be disposed on the four edges section 122*a*". That is, as shown in FIG. 2A, a central part of the square top section 122*a*' within the connection border 1221 may be transparent (i.e. the transparent section 122*m*), and a peripheral part of the square top section 122*a*' and the four edges section 122*a*" (collectively 122*n*) may be opaque or black; as shown in FIG. 2B, the square top section 122*a*' and an upper part of the four edges section 122*a*" above the connection border 1221' (collectively the transparent section 122*m*') may be transparent, and a lower part of the four edges section 122*a*" (i.e. 122*n*') below the connection border 1221' may be opaque or black.

The key 122 may include a pusher portion 122*f* between the cap portion 122*a* and the pivot mechanisms 122*d*, 122*e*, the pusher portion 122*f* of the key 122 being aligned to the switch 132 in a manner so as to actuate the switch 132 to generate an input signal when the key 122 is depressed to pivot about the pivot mechanisms 122*d*, 122*e* from the undepressed state to the depressed state. The pusher portion 122*f* may be disposed between the two arm portions 122*b*, 122*c*, in a middle region along the side 122*i* of the cap portion 122*a* where the two arm portions 122*b*, 122*c* extend. In some implementations, the key 122 may further include a lateral portion 122*j* directly extending from the side 122*i* (edge) of the cap portion 122*a* and disposed between the cap portion 122*a* and the two arm portions 122*b*, 122*c*. The two arm portions 122*b*, 122*c* may directly extend from two corners of the lateral portion 122*j* of the key 122 and the pusher portion 122*f* may be disposed on the lateral portion 122*j* and in a middle region between the two arm portions 122*b*, 122*c*. In other words, the pusher portion 122*f* may be equally spaced apart from the two arm portions 122*b*, 122*c*. When the key 122 is depressed from the undepressed state to the depressed state, the pusher portion 122*f* of the key 122 may be moved to activate the switch 132; the push portion 122*f*, being centrally disposed with respect to the side 122*i* of the key 122, may come into contact with the switch 132 with an evenly distributed pressure from the user, thereby increasing the service life of the computer peripheral 100.

According to various non-limiting embodiments, the key 122 may further include at least one stopper (e.g. 122*h*, 122*g*) to stop the key 122 from moving when the key 122 reaches the depressed state. The key 122 may include two stoppers 122*h*, 122*g*, respectively disposed at two corners of a parallel side 122*k* (e.g. with respect to the side 122*i*) of the cap portion 122*a* of the key 122. That is, the stoppers 122*h*, 122*g* may be disposed along a side of the key 122 (e.g. a wall) opposite to the pusher portion 122*f* with respect to the cap portion 122*a*. The stoppers 122*h*, 122*g* may be protruded from the two corners of the parallel side 122*k*, following the arc-shaped corners and invisible from a top view of the cap portion 122*a* of the key 122. It should be appreciated that although two stoppers 122*h*, 122*g* are shown herein, the key 122 may have one or three or any number of stoppers disposed on any side of the cap portion 122*a*. For example, the key 122 may have one stopper disposed on a middle region of the side 122*k* of the cap portion 122*a*

According to various non-limiting embodiments, the computer peripheral 100 may include the set of keys 120 arranged in rows. For example, there may be another key 123 in the row disposed next to the key 122 as shown in FIG. 2A (i.e. to the negative Y-direction) and further another key 124 in the row disposed next to the key 122 as shown in FIG. 2B (to the position Y-direction). One arm portion 123*c* of the key 123 may extend in parallel with the arm portion 122*b* of the key 122. Similarly, one arm portion 124*b* of the key 124 may extend in parallel with the arm portion 122*c* of the key 122. Accordingly, pivot axis of the pivot mechanisms of the keys 123, 124 may be parallel to the pivot axis of the pivot mechanisms 122*d*, 122*e* of the key 122 and enable pivot movements of the keys 123, 124 parallel to the pivot axis of the key 122.

Figure 3:
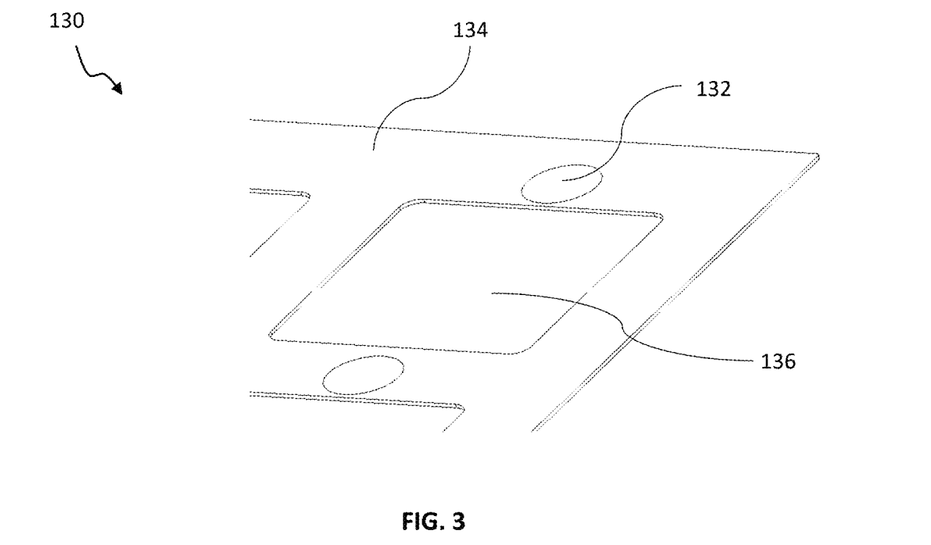
FIG. 3 is a diagram showing a partial perspective view of a switch plate of the example computer peripheral of FIG. 1.
Figure 4:
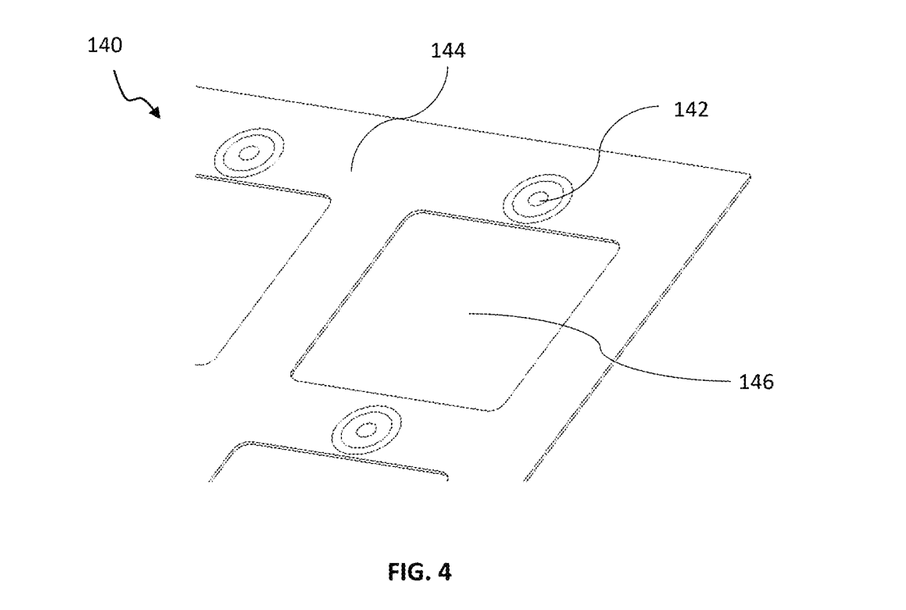
FIG. 4 is a diagram showing a partial perspective view of an auxiliary circuit board of the example computer peripheral of FIG. 1.
Figure 5:
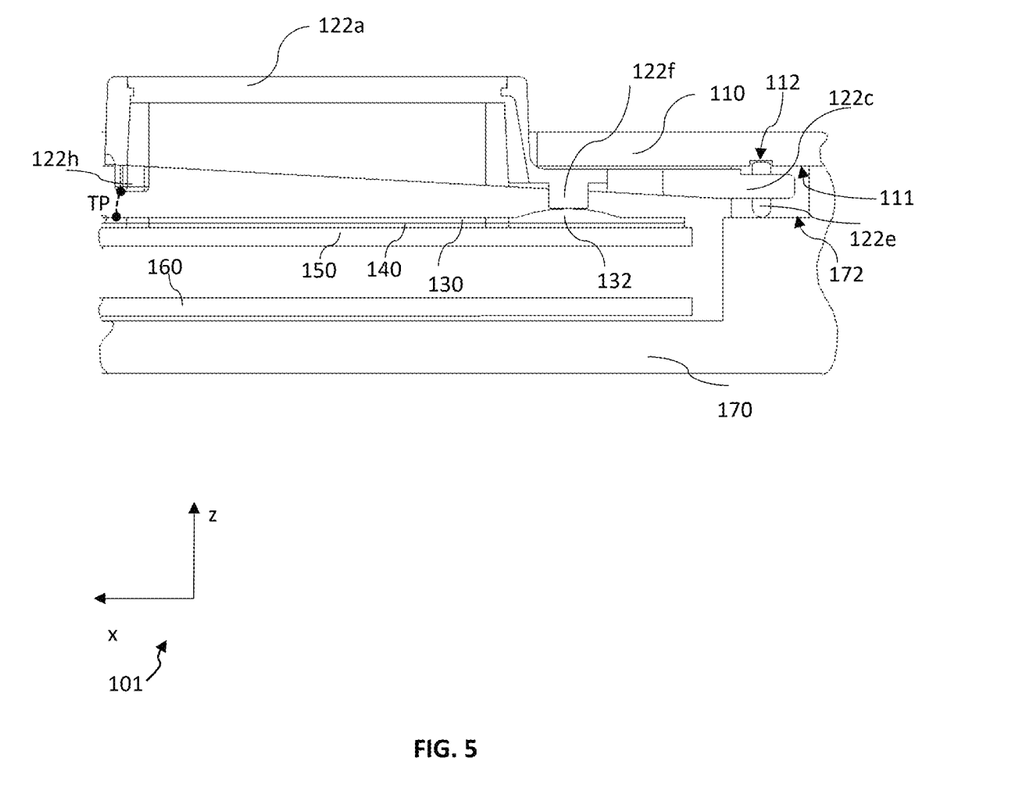
FIG. 5 is a diagram showing a partial side view of the example computer peripheral of FIG. 1 in an undepressed state.

FIG. 3 depicts a partial perspective view of the switch plate 130 of the computer peripheral 100. FIG. 4 depicts a partial perspective view of the auxiliary circuit board 140 of the computer peripheral 100. In some embodiments, the switch plate 130 may further include a carrier plate 134 having at least one opening (e.g. 136). The at least one switch 132 of the switch plate 130 may be disposed on the carrier plate 134 in the vicinity of the at least one opening 136, for example, over a top edge of the opening 136. The at least one switch 132 of the switch plate 130 may include a dome hybrid switch of flat-panel membrane and mechanical switches capable of producing an audible click sound or providing a tactile sensation or both upon being actuated. The switch 132 may also include a dome switch (as shown in FIG. 5) having a deformable dome portion (or cap portion) or a contact plate switch having contact plates. The dome portion may be deformed by the pusher portion 122*f* of the key 122 when the key 122 is depressed from the undepressed state to the depressed state. In some embodiments, the auxiliary circuit board 140 may further include a circuit carrier 144 having at least one opening (e.g. 146). The at least one switch contact circuit 142 of the auxiliary circuit board 140 may be disposed on the circuit carrier 144 in the vicinity of the at least one opening 146, for example, over a top edge of the opening 146. The key 122 may be associated with the switch 132, and the switch 132 may be associated with the switch contact circuit 142 such that, when the key 122 is depressed from the undepressed state to the depressed state, the switch 132 may be activated and the switch contact circuit 142 may be correspondingly closed to provide an input signal.

The pusher portion 122f may be disposed on the lateral portion 122j of the key 122. The switch 132 and the switch contact circuit 142 may be in vertical (i.e. in the Z-direction) alignment or in a stacked arrangement whereby the switch 132 may be on top of the switch contact circuit 142 such that the depression of the key 122 may provide a seamless activation through the substantially simultaneous activation of the switch 132 together with the closing of the switch contact circuit 142. Further, the disposition of the push portion 122f on the lateral portion 122j of the key 122 (e.g. an (outward) extension from the cap portion 122a) may prevent blocking or obstruction of the viewing of information on the display 150 through the cap portion 122a of the key 122 by the push portion 122f and correspondingly the switch 132 and the switch contact circuit 142.

The at least one openings of the auxiliary circuit board 140 and the switch plate 130 may be in alignment with the at least one opening of the frame structure 110, respectively. Furthermore, dimensions of the at least one opening 146 of the auxiliary circuit board 140 and dimensions of the at least one opening 136 of the switch plate 130 may be greater than or equal to dimensions of the cap portions of the set of keys 120 so as not to obstruct the viewing of information on the display 150 through the cap portions of the set of keys 120.

Figure 6:
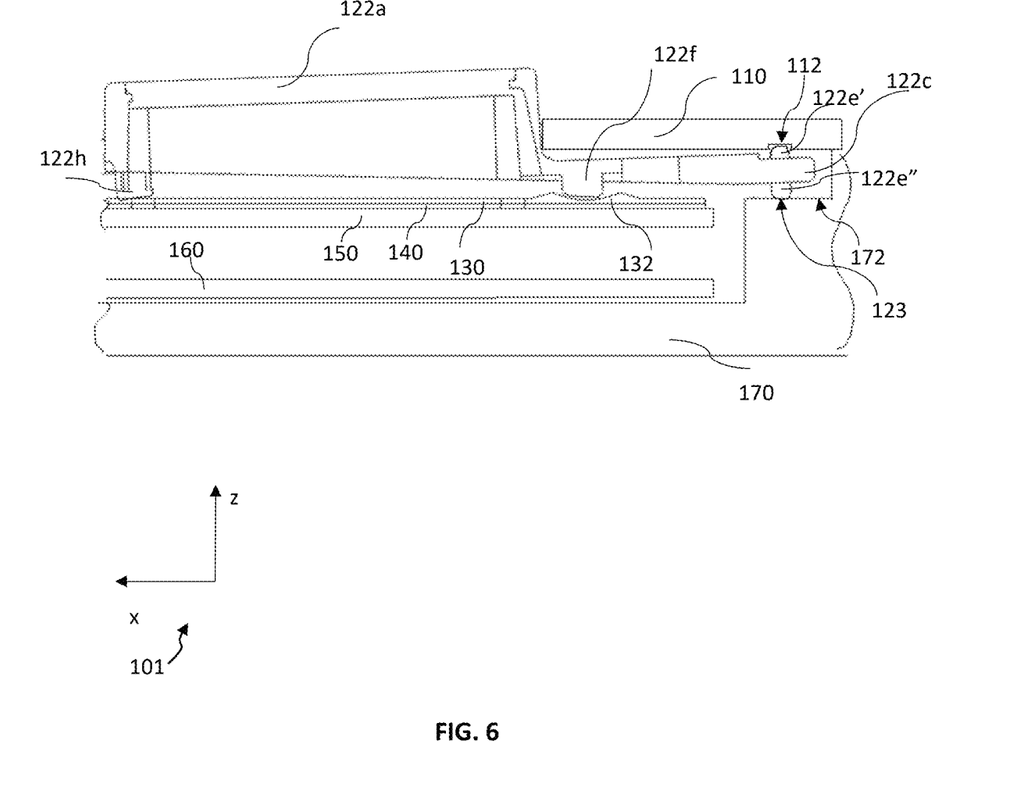
FIG. 6 is a diagram showing a partial side view of the example computer peripheral of FIG. 1 in a depressed state.

The operation of the key 122 of the computer peripheral is now described with reference to FIGS. 5 and 6. FIG. 5 depicts a partial side view of the computer peripheral 100 in the undepressed state. FIG. 6 depicts a partial side view of the computer peripheral 100 in the depressed state. A travel path of the key 122 is denoted as TP as shown in FIG. 5.

According to various non-limiting embodiments, as shown in FIG. 5, the cap portion 122a of the key 122 may be exposed through the opening 112 of the frame structure 110. The arm portions 122b (not shown), 122c of the key 122 may extend between the cap portion 122a and the pivot mechanisms 122d (not shown), 122e underneath the frame structure 110. Accordingly, the cap portion 122a and the arm portions 122b (not shown), 122c, of the key 122 may form a step profile in a manner such that the cap portion 122a protrudes from the opening 112 of the frame structure 110 and the arm portions 122b, 122c extends underneath the frame structure 110. Further, the top section 122a' of the cap portion 122a may be higher (e.g. in the Z-direction) in relative to a top surface of the frame structure 110. That is, the cap portion 122a and the frame structure 110 may form a step-like configuration so that the user would easily locate the key 122.

The arm portions 122b (not shown), 122c, of the key 122 may extend beyond the switch arrangement 135. The pivot mechanisms 122d (not shown), 122e may be disposed directly between the frame structure 110 and the base housing structure 170. In some other implementation, the arm portions 122b (not shown), 122c, of the key 122 may not extend beyond the switch arrangement 135. Similarly, the pivot mechanisms 122d (not shown), 122e may be disposed directly between the frame structure 110 and the switch plate 130. The frame structure 110 may include at least one recess (e. g. 112) at an underneath surface 111 thereof. The pivot mechanisms 122d (not shown), 122e may be in engagement with the recess 112 of the frame structure 110 so as to prevent dislodgement of the key 122 when the key 122 is being pivoted about the pivot mechanism 122d (not shown), 122e. In other words, the recess 112 may prevent the key 122 from forward or backward displacement when a user presses the key 122.

According to various non-limiting embodiments, the pivot mechanism 122e may include two oppositely extending protrusions 122e', 122e" (as labelled in FIG. 6), protruding from a free-end segment of the arm portion 122c. A first 122e' of the two oppositely extending protrusions 122e', 122e", may be inserted into the recess 112 of the frame structure 110 and a second 122e" of the two oppositely extending protrusions 122e', 122e", may be in abutment with a flat surface portion 172 of the base housing structure 170. The second 122e" of the two oppositely extending protrusions 122e', 122e", may have a rounded tip 123 in abutment with the flat surface portion 172 of the base housing structure 170 so as to be pivotable with respect to the flat surface portion 172. For example, the rounded tip 123 of the second 122e" of the two oppositely extending protrusions 122e', 122e" may move in a rocking manner with respect to the flat surface portion 172. The rounded tip 123 of the second end 122e" may enable a smooth and quiet pivot movement of the key 122. Due to short travel of the key 122, the arm portions 122b, 122c may be flexing, in other words, capable of bending and then reverting to shape. Accordingly, the overall travel of the key 122 may be a combination of hinged (pivot) mechanism and flexing of the arm portions 122b, 122c. In some embodiments, the second 122e" of the two oppositely extending protrusions 122e', 122e", may not have the rounded tip 123 in abutment with the flat surface portion 172 of the base housing structure 170, but instead may be flexing. Accordingly, the arm portions 122b, 122c may be flexing and move without any rocking movement.

In some other implementation, the second 122" of the two oppositely extending protrusions may not be in abutment with a flat surface portion of a base housing structure 170 and, instead, the second 122" may be in abutment with the carrier plate 134 of the switch plate 130. Accordingly, the pivot mechanism 122e may move in a similar manner with respect to the carrier plate 134 of the switch plate 130. The pivot mechanism 122d may include the similar structure as the pivot mechanism 122e. It should be appreciated that the pivot mechanism shall not be limited to the embodiments as disclosed herein, and shall include any other suitable pivot mechanism, for example, instead the first end 122e' inserted into the recess 122, there may be a protrusion from the frame structure 110 inserted into a recess in the arm portion 122c and the rounded tip 123 of the first end 122e' pivotable with respect to a flat surface of the frame structure 110. In another example, the second end 122e" may be inserted into a recess in the base housing structure 170 or the switch plate 130. In fact, there may be other coupling mechanisms that enable the movement of the key 122.

When the key 122 is pressed, via the cap portion 122a, the key 122 may pivot towards the switch plate 130 along the travel path TP. The pusher portion 122f of the key 122 may be moved towards the associated switch 132 and press to activate the switch 132. The stoppers 122h, 122g (not shown), may be blocked by the switch plate 130 so as to stop the key 122 from moving when the key 122 reaches the depressed state. An input signal may be generated by the switch contact circuit 142 of the auxiliary circuit board 140 when the switch 132 is being actuated. The set of keys 120 may be depressed by the user individually or in combination. The deformed dome portion of the switch 132 may return back to the undeformed state once the user withdraws the depression from the key 122 and accordingly bias the key 122 towards the undepressed state. That is, the key 122 may be biased to the undepressed state by the switch 132. Alternatively, a biasing member (not shown) may be used in addition to the switch 132 to bias the key 122 towards the undepressed state.

Figure 7:
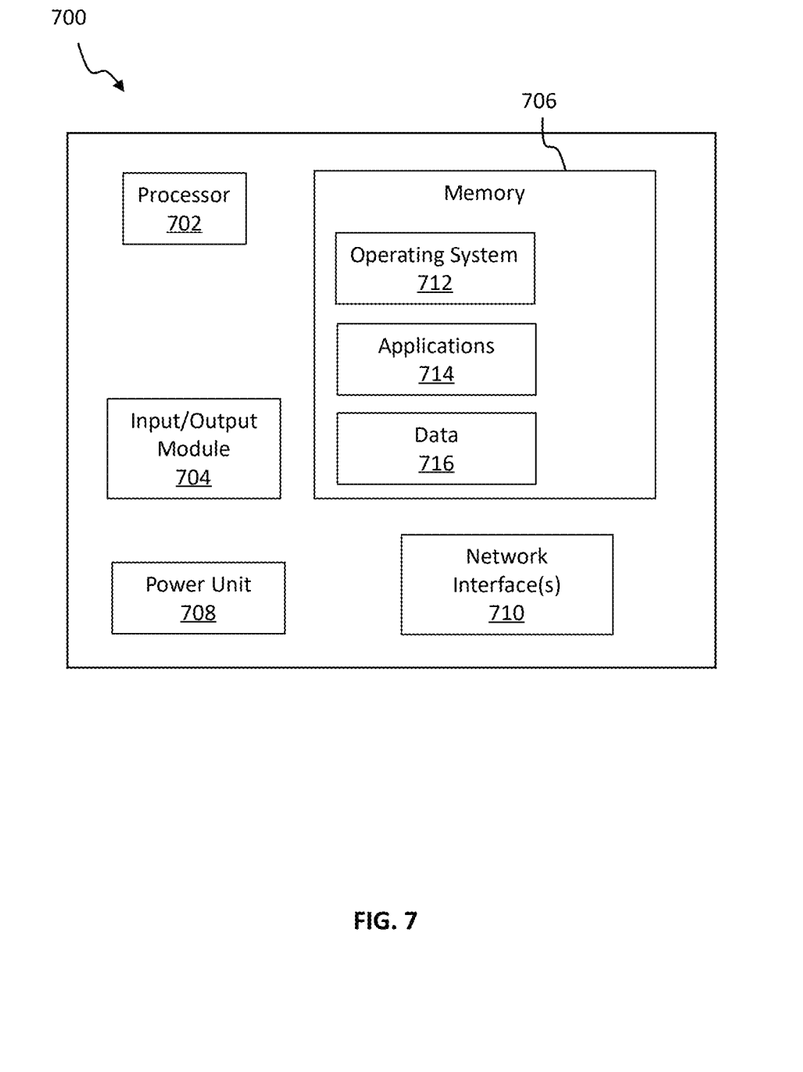
FIG. 7 is a block diagram showing an example electronic device, according to an implementation of the present disclosure.

FIG. 7 is a block diagram showing an example electronic device 700, according to an implementation of the present disclosure. The electronic device 700 may be a laptop computer, a desktop computer, a tablet computer, an automobile computer, a gaming device, a smart phone, a personal digital assistant, a server, a computer peripheral or other electronic devices capable of running computer applications. In some implementations, the electronic device 700 includes a processor 702, an input/output (I/O) module 704, memory 706, a power unit 708, and one or more network interfaces 710. The electronic device 700 may include additional components. In some implementations, the processor 702, input/output (I/O) module 704, memory 706, power unit 708, and the network interface(s) 710 are housed together in a common housing or other assembly.

The example processor 702 may execute instructions, for example, to generate output data based on data inputs. The instructions may include programs, codes, scripts, modules, or other types of data stored in memory (e.g., memory 706). Additionally or alternatively, the instructions may be encoded as pre-programmed or re-programmable logic circuits, logic gates, or other types of hardware or firmware components or modules. The processor 702 may be, or may include, a multicore processor having a plurality of cores, and each such core may have an independent power domain and may be configured to enter and exit different operating or performance states based on workload. Additionally or alternatively, the processor 702 may be, or may include, a general-purpose microprocessor, as a specialized co-processor or another type of data processing apparatus. In some cases, the processor 702 performs high-level operation of the electronic device 700. For example, the processor 702 may be configured to execute or interpret software, scripts, programs, functions, executables, or other instructions stored in the memory 706.

The example I/O module 704 may include a mouse, keypad, touch screen, scanner, optical reader, and/or stylus (or other input device(s)) through which a user of the electronic device 700 may provide input to the electronic device 700, and may also include one or more of a speaker for providing audio output and a video display device for providing textual, audiovisual, and/or graphical output.

The example memory 706 may include computer-readable storage media, for example, a volatile memory device, a non-volatile memory device, or both. The memory 706 may include one or more read-only memory devices, random-access memory devices, buffer memory devices, or a combination of these and other types of memory devices. In some instances, one or more components of the memory may be integrated or otherwise associated with another component of the electronic device 700. The memory 706 may store instructions that are executable by the processor 702. In some examples, the memory 706 may store instructions for an operating system 712 and for application programs 714. The memory 706 may also store a database 716.

The example power unit 708 provides power to the other components of the electronic device 700. For example, the other components may operate based on electrical power provided by the power unit 708 through a voltage bus or other connection. In some implementations, the power unit 708 includes a battery or a battery system, for example, a rechargeable battery. In some implementations, the power unit 708 includes an adapter (e.g., an AC adapter) that receives an external power signal (from an external source) and coverts the external power signal to an internal power signal conditioned for a component of the electronic device 700. The power unit 708 may include other components or operate in another manner.

The electronic device 700 may be configured to operate in a wireless, wired, or cloud network environment (or a combination thereof). In some implementations, the electronic device 700 may access the network using the network interface(s) 710. The network interface(s) 710 may include one or more adapters, modems, connectors, sockets, terminals, ports, slots, and the like. The wireless network that the electronic device 700 accesses may operate, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others. The wired network that the electronic device 700 accesses may, for example, include Ethernet, SONET, circuit-switched networks (e.g., using components such as SS7, cable, and the like), and others.

Various embodiments of what is described here have provided a computer peripheral with augmented user experience.

Some of the subject matter and operations described in this specification may be implemented in digital electronic circuitry, or in computer software, firmware, or hardware, including the structures disclosed in this specification and their structural equivalents, or in combinations of one or more of them. Some of the subject matter described in this specification may be implemented as one or more computer programs, i.e., one or more modules of computer program instructions, encoded on a computer storage medium for execution by, or to control the operation of, data-processing apparatus. A computer storage medium may be, or may be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium may also be, or be included in, one or more separate physical components or media (e.g., multiple CDs, disks, or other storage devices).

Some of the operations described in this specification may be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus may include special purpose logic circuitry, e.g., an FPGA (field programmable gate array) or an ASIC (application specific integrated circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program, or in multiple coordinated files (e.g., files that store one or more modules, subprograms, or portions of code). A computer program may be deployed to be executed on one computer or on multiple computers that are located at one site or distributed across multiple sites and interconnected by a communication network.

Some of the processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many details, these should not be understood as limitations on the scope of what may be claimed, but rather as descriptions of features specific to particular examples. Certain features that are described in this specification or shown in the drawings in the context of separate implementations may also be combined. Conversely, various features that are described or shown in the context of a single implementation may also be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single product or packaged into multiple products.

A number of implementations have been described. Nevertheless, it will be understood that various modifications can be made. Accordingly, other implementations are within the scope of the following claims.

What is claimed is:
1. A computer peripheral, comprising:
a display;
an input interface assembly disposed over the display, wherein the input interface assembly comprises a frame structure and at least one key movably coupled to the frame structure, and wherein the at least one key comprises a cap portion having a transparent section configured to permit viewing of information on the display through the transparent section of the cap portion;
a switch arrangement comprising at least one switch disposed between the input interface assembly and the display, the at least one switch being associated with the at least one key of the input interface assembly,
wherein the at least one key is pivotally depressible relative to the frame structure between an undepressed state and a depressed state about a pivot mechanism; wherein the at least one key comprises a pusher portion between the cap portion and the pivot mechanism, the pusher portion of the at least one key being aligned to the at least one switch in a manner so as to actuate the at least one switch to generate an input signal when the at least one key is depressed to pivot about the pivot mechanism from the undepressed state to the depressed state.

2. The computer peripheral of claim 1, wherein the frame structure comprises at least one opening and the at least one key is coupled to the frame structure with the cap portion being exposed through the at least one opening, wherein the at least one key comprises at least one arm portion extending between the cap portion and the pivot mechanism underneath the frame structure.

3. The computer peripheral of claim 2, wherein the at least one key comprises two arm portions extending in a parallel manner from a same side of the cap portion, and two pivot mechanisms respectively disposed at free-end segments of the two arm portions.

4. The computer peripheral of claim 2, wherein the cap portion of the at least one key and the at least one arm portion of the at least one key forms a step profile in a manner such that the cap portion protrudes from the at least one opening of the frame structure.

5. The computer peripheral of claim 2, further comprising a base housing structure, wherein the switch arrangement is disposed between the frame structure and the base housing structure.

6. The computer peripheral of claim 5, wherein the at least one arm portion of the at least one key extends beyond the switch arrangement and the pivot mechanism is disposed directly between the frame structure and the base housing structure.

7. The computer peripheral of claim 6, wherein the frame structure comprises a recess on an underneath surface thereof and wherein the pivot mechanism is in engagement with the recess of the frame structure so as to prevent dislodgement of the at least one key when the at least one key is being pivoted about the pivot mechanism.

8. The computer peripheral of claim 7, wherein the pivot mechanism comprises two oppositely extending protrusions protruding from a free-end segment of the at least one arm portion, wherein a first of the two oppositely extending protrusions is inserted into the recess of the frame structure and a second of the two oppositely extending protrusions is in abutment with a flat surface portion of the base housing structure, wherein the second of the two oppositely extending protrusions has a rounded tip in abutment with the flat surface portion of the base housing structure so as to be pivotable with respect to the flat surface portion.

9. The computer peripheral of claim 6, further comprises a circuit board disposed over the base structure and beneath the display.

10. The computer peripheral of claim 9, wherein the switch arrangement comprises an auxiliary circuit board and a switch plate having the at least one switch, wherein the auxiliary circuit board comprises at least one switch contact circuit, the at least one switch contact circuit being associated to the at least one switch, wherein the auxiliary circuit board is between the display and the switch plate.

11. The computer peripheral of claim 10, wherein the input signal is generated by the auxiliary circuit board when the at least one switch is being actuated.

12. The computer peripheral of claim 10, wherein each of the auxiliary circuit board and the switch plate comprises at least one opening respectively in alignment with the at least one opening of the frame structure.

13. The computer peripheral of claim 9, wherein the circuit board comprises a USB connector.

14. The computer peripheral of claim 9, wherein the circuit board comprises a processor, configured to execute the instructions:
   obtain data comprising operations performed by at least one software application;
   configure the display, based on the data, to designate operations that the at least one key performs in the at least one software application upon receiving an input from a user;
   display the operations on the display;
   enable, via the at least one key, the user to provide the input;
   convert the input into a required format that is understandable by the at least one software application; and
   transmit the converted input to the at least one software application to control the at least one software application.

15. The computer peripheral of claim 1, wherein the at least one key is entirely made of transparent material.

16. The computer peripheral of claim 1, wherein the at least one switch comprise a mechanical-type switch capable of producing an audible click sound or providing a tactile sensation or both upon being actuated, wherein the at least one switch comprises dome switch having a deformable dome portion, wherein the dome portion is deformed by the pusher portion of the at least one key when the at least one key is depressed from the undepressed state to the depressed state.

17. The computer peripheral of claim 1, wherein the at least one key comprises at least one stopper to stop the at least one key from moving when the at least one key reaches the depressed state.

18. The computer peripheral of claim 17, wherein the at least one stopper is disposed along an edge of the at least one key opposite to the pusher portion with respect to the cap portion, wherein the at least one key comprises two stoppers respectively disposed at two corners of the edge of the at least one key.

19. The computer peripheral of claim 1, wherein the display is a liquid crystal display (LCD) device.

20. An input interface assembly, comprising:
   a frame structure and at least one key movably coupled to the frame structure, wherein the at least one key comprises a cap portion having a transparent section and wherein the frame structure has at least one opening in alignment with the transparent section;
   a switch arrangement comprising at least one switch disposed below the frame structure and the at least one key, the at least one switch being associated with the at least one key, wherein the switch arrangement comprises at least one opening in alignment with the at least one opening of the frame structure;
   wherein the at least one key is pivotally depressible relative to the frame structure between an undepressed state and a depressed state about a pivot mechanism; wherein the at least one key comprises a pusher portion between the cap portion and the pivot mechanism, the pusher portion of the at least one key being aligned to the at least one switch in a manner so as to actuate the at least one switch to generate an input signal when the at least one key is depressed to pivot about the pivot mechanism from the undepressed state to the depressed state.

* * * * *